Feb. 26, 1935.  H. NEHLS ET AL  1,992,834

ELECTRIC METER

Filed Jan. 17, 1933

Inventors
Herbert Nehls.
David L. Keiser.
by
H. S. Dennison
atty.

Patented Feb. 26, 1935

1,992,834

UNITED STATES PATENT OFFICE 1,992,834

ELECTRIC METER

Herbert Nehls, Hawthorne, N. J., and David L. Keiser, San Antonio, Tex., assignors to Sangamo Company Limited, Toronto, Ontario, Canada Application January 17, 1933, Serial No. 652,234

5 Claims. (Cl. 171—34)

The principal object of the invention is to provide a meter for measuring electric current, which cannot be tampered with in such a manner as to erroneously affect the indication and recording of the amount of current used.

The principal feature of the invention consists in the novel arrangement of a pair of metering elements whereby the recording mechanism is operated by the movement of either or both of said elements in the normal or forward direction and such movement is transmitted through ratchet or clutch mechanisms which will not permit of a reverse movement being transmitted to the recording mechanism, the flow of current to the load lines being necessarily directed through both of said metering elements.

In the drawing, Figure 1 is a front elevational view of a portion of the mechanism arranged within a meter constructed in accordance with this invention.

This invention has been devised to overcome a difficulty that has been experienced in the measuring of electric current where clever wits have been employed to defraud the parties supplying the electric power, by the application of various forms of connections to effect a reversal of energy through the meter coils and to thereby reverse the recording mechanism so that an erroneous and false record is displayed.

In order to overcome such manipulations the applicants propose the use of two electrically responsive recording elements represented by the discs A and A', the spindles $a$ and $a'$ of which are formed with worm ends meshing with the worm wheels $b$ and $b'$ mounted respectively upon the shafts B and B' which are arranged in axial alignment, but separated the one from the other.

A recording mechanism 1 interposed between the shafts B and B' is provided with a series of recording discs 2 which are interconnected in the usual manner for counting purposes and are operated through a train of gears operatively connected with the shaft E.

On the opposite ends of the shaft E are arranged the ratchet wheels D and D' and the perimeters of these wheels are engaged by spring ratchet members C and C' mounted respectively upon the shafts B and B'.

The discs A and A' normally rotate in the same direction and since the meter coils or elements 12 and 14 are both connected to the same load in the same circuit, such discs will be normally rotated at the same or equal speed and through their respective worm drives and the shafts B and B' operate through the ratchets C and C' to rotate the shaft E, and thus the train of gears connected with the recording mechanism is driven in accordance with the current being used.

It will be seen that the shaft E is common to both metering mechanisms and that both metering mechanisms normally rotate at the same or equal speed so that they each tend to rotate the shaft E in a common direction through their respective ratchet clutches, but should for any reason, one of the metering mechanisms be slowed up or stopped the other one will carry on at the same speed at which it was operating in accordance with the normal flow of energy flowing therethrough so that the recording gear train speed will not be altered.

If any counter-influence to the flow of current through the meter is applied at either side thereof the current flowing to the load lines will necessarily continue to operate the other one of the metering devices at normal speed proportional to the amount of energy being used and its operation will not be detrimentally affected by whatever phenomena may be created to retard the operation of the other device so that the normally operating metering device will continue to drive the registering gear train through its ratchet clutch unaided or unhindered by the retarded metering device, which will be allowed to lag behind as its respective ratchet clutch is overrun by the faster rotating shaft E.

Figure 1:
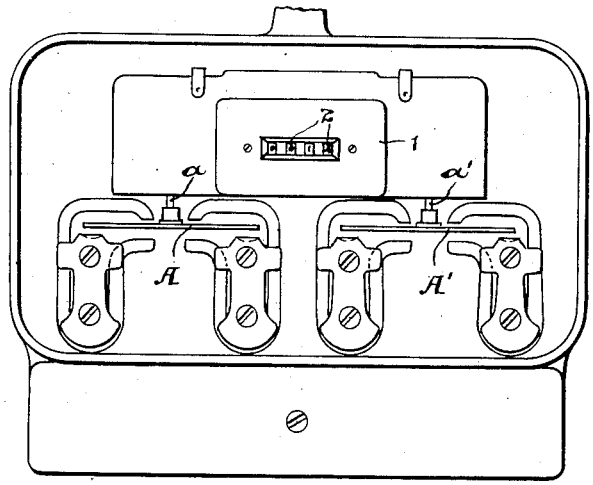
Figure 2:
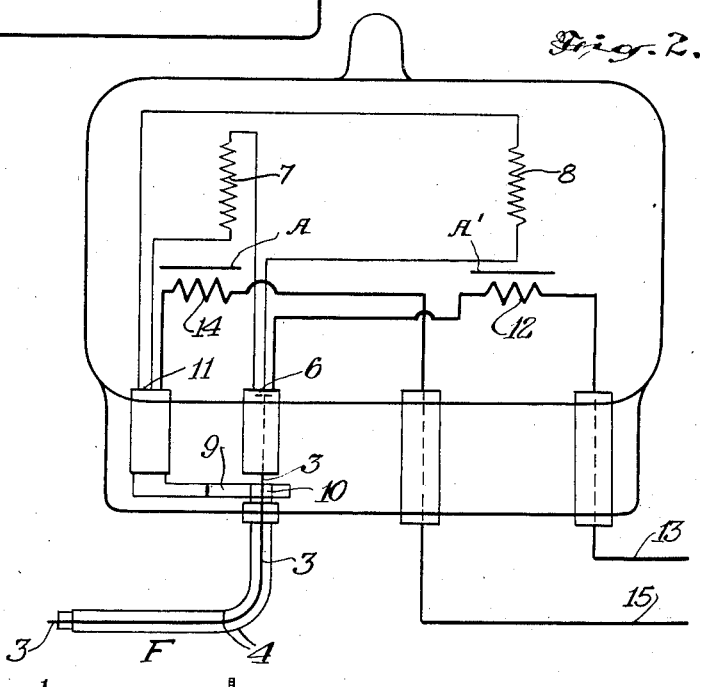
Figure 2 is a wiring diagram of the meter.
Figure 3:
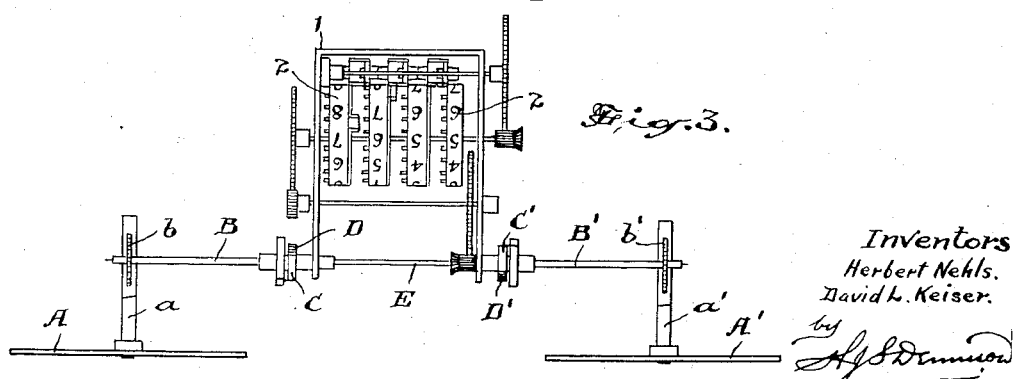
Figure 3 is an elevational detail showing the preferred means for connecting the recording mechanism with the metering devices.

Referring particularly to the diagrammatic showing in Figure 2, the incoming supply leads are preferably in the form of a concentric cable F which in itself forms no part of the present invention and can be bought on the open market. Such cable comprises a central conducting core 3 overlayed with a heavy insulating stratum which in turn is overlaid by a tubular braided cable conductor 4 suitably insulated on the outward side.

The central conductor 3 is connected within the meter casing 5 at the point 6 to one end of each of the high resistance meter coils 7 and 8 and a terminal clamp 9 embraces the outer braided cable conductor at 10 and extends to the point 11 where it connects to the other ends of the high resistance coils 7 and 8.

The central conductor 3 is also connected at the point 6 to one end of the low resistance meter coil 12, the other end of which coil is connected with one load wire 13. The braided cable lead 4 is connected through the clamp 9 to the other low resistance meter coil 14, the other end of which coil is connected to the other load wire 15.

Thus current coming in say on the central conductor 3 first traverses the coil 12 along the load wire 13 and back by way of wire 15 through the other meter coil 14 and out by way of the outer cable conductor 4.

It will therefore be understood that as long as the current flows through the meter an accurate measurement of such flow will occur irrespective of the application of retarding or reversing influences at either side of the meter, such as by the application of a "jumper" connection across one or other of the meter circuits, or the circulation of a phantom circuit.

It will further be understood that if any electric energy is applied to the meter circuit at any time to effect a reverse movement of the metering elements, such movement will be ineffective in respect to altering the amount of energy recorded as the means for driving the recording mechanism will only operate the recording mechanism in a forward direction.

What we claim as our invention is:—

1. A watt hour meter comprising a common recording device, a pair of electrically operated elements electrically connected with the load lines, said elements being both connected to the same load in the same circuit whereby they normally rotate at the same or equal speed, and each being operatively connected with said common recording mechanism to turn it in the forward direction only, whereby on the application of a retarding or reversing influence to either one of said elements the other element will continue to operate at a normal speed to drive said recording device.

2. A watt hour meter comprising a common recording device, a pair of electrically operated elements connected one in each line of a two wire service and operating in accordance with the flow of energy, said elements being both connected to the same load in the same circuit whereby they normally rotate at the same or equal speed, means interposed between each of said electrically operated elements and said recording device to effect the turning of the recording device in the forward direction only.

3. A watt hour meter having an electrically operated metering element arranged one in each side of the line supply, said elements being both connected to the same load in the same circuit whereby they normally rotate at the same or equal speed, a recording mechanism common to both metering elements, and clutch means connecting each of said metering elements with said recording element to operate said recording element in accordance with the speed of the faster operating metering element.

4. A watt hour meter comprising a common recording device having an operating shaft, clutch devices mounted one on each end of said shaft to turn said shaft in one direction only, shafts connected with each of said clutch devices, and electrically operated means normally rotating said latter shafts both at the same or equal speed in accordance with the normal flow of energy through the meter.

5. A watt hour meter, a pair of current coils arranged one in each side of the line supply, said coils being both connected to the same load in the same circuit whereby said discs normally rotate at the same or equal speed, integrating meter discs arranged within the zone of influence of said current coils, shafts connected to said meter discs, shafts operatively connected with each of the aforesaid shafts, each of the latter having a ratchet dog mounted thereon, a shaft interposed between the aforesaid pair of shafts and having ratchet wheels mounted thereon engaged by said ratchet dogs, said dogs and ratchets being capable of turning the latter shaft in one direction only, and a recording mechanism operatively connected with the latter shaft.

HERBERT NEHLS.
DAVID L. KEISER.